United States Patent [19]

Drent

[11] Patent Number: 4,808,697

[45] Date of Patent: Feb. 28, 1989

[54] CATALYTIC PROCESS FOR PREPARING POLYMERS OF SULFUR DIOXIDE AND OLEFIN

[75] Inventor: Eit Drent, Amsterdam, Netherlands

[73] Assignee: Shell Oil Company, Houston, Tex.

[21] Appl. No.: 164,161

[22] Filed: Mar. 3, 1988

Related U.S. Application Data

[63] Continuation-in-part of Ser. No. 918,422, Oct. 14, 1986, abandoned.

[30] Foreign Application Priority Data

Oct. 15, 1985 [NL] Netherlands ............... 8502817

[51] Int. Cl.⁴ ............................................. C08G 75/18
[52] U.S. Cl. ..................................... 528/384; 528/382; 528/383; 528/386; 528/392
[58] Field of Search ............... 528/386, 392, 382, 384, 528/383

[56] References Cited

U.S. PATENT DOCUMENTS

| | | | |
|---|---|---|---|
| 2,943,077 | 6/1960 | deJong et al. | 528/386 |
| 3,448,140 | 6/1969 | Gamlen et al. | 260/471 |
| 3,657,202 | 4/1972 | Hammer et al. | 528/386 |
| 4,251,340 | 2/1981 | Johnson et al. | 528/386 |
| 4,474,978 | 10/1984 | Drent | 560/24 |

FOREIGN PATENT DOCUMENTS 220765 5/1987 European Pat. Off. .
2058074 4/1981 United Kingdom .

Primary Examiner—Harold D. Anderson

[57] ABSTRACT

The invention is a process for preparing linear alternating polymers of sulfur dioxide, ethylene, optionally at least one ethylenically unsaturated hydrocarbon other than ethylene and optionally carbon monoxide having the general formula

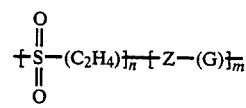

wherein Z is at least one moiety selected from $SO_2$ and CO, G is the moiety of at least one ethylenically unsaturated hydrocarbon of at least 2 carbon atoms polymerized through the ethylenic unsaturation, n is an integer of at least 1, and m is an integer of zero or greater, which process comprises contacting sulfur dioxide, ethylene, optionally carbon monoxide, and optionally at least one ethylenically unsaturated hydrocarbon of at least 2 carbon atoms, in the presence of a catalyst obtained from (1) a compound of a Group VIII metal selected from palladium, cobalt and nickel, (2) a bidentate ligand of phosphorus, arsenic, or antimony, and (3) an anion of a non-hydrohalogenic acid having a pKa of less than 6.

18 Claims, No Drawings

CATALYTIC PROCESS FOR PREPARING POLYMERS OF SULFUR DIOXIDE AND OLEFIN

CROSS REFERENCE TO RELATED CASE APPLICATIONS

This is a continuation-in-part of application Ser. No. 918,422, filed Oct. 14, 1986, now abandoned.

FIELD OF THE INVENTION

The invention relates to a process for preparing linear alternating polymers of sulfur dioxide and at least one ethylenically unsaturated hydrocarbon. The invention also relates to a process for preparing linear alternating polymers of sulfur dioxide and at least one ethylenically unsaturated hydrocarbon which polymers further comprise carbon monoxide.

BACKGROUND OF THE INVENTION

High melting polymers of sulfur dioxide with olefins, such as ethylene, have been known for many years. Such polymers are generally prepared by reacting the monomers in the presence of a free radical catalyst, such as a peroxide, and the polymers typically consist of alternating units of sulfur dioxide and olefin having a 1:1 molar ratio in the polymer chain. Copolymers of sulfur dioxide and ethylene having a ratio greater than one have also been prepared, for example, as disclosed in U.S. Pat. Nos. 2,943,077 and 3,657,202.

Terpolymers of sulfur dioxide, olefins and carbon monoxide are also well known. For example, U.S. Pat. No. 2,634,254 discloses such terpolymers prepared by polymerizing sulfur dioxide, ethylene and carbon monoxide in the presence of free radical generating catalysts such as azo compounds. U.S. Pat. No. 4,251,340 discloses similar terpolymers prepared by irradiation of a mixture of sulfur dioxide, carbon monoxide and ethylene. These terpolymers are generally high melting polymers stable up to a temperature of about 280° C. The polymers show good durability and structural properties and the polymers have particular utility in high temperature applications.

It would be desireable to have a new process to prepare polymers of sulfur dioxide, olefins and optionally carbon monoxide.

SUMMARY OF THE INVENTION

The present invention relates to a new process for preparing polymers comprising sulfur dioxide and at least one ethylenically unsaturated hydrocarbon. In particular, the invention relates to a process for preparing linear alternating polymers of sulfur dioxide, ethylene, optionally at least one ethylenically unsaturated hydrocarbon other than ethylene and optionally carbon monoxide.

The present invention is a process for preparing a linear alternating polymer having the general formula

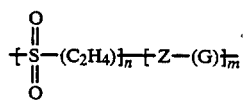

wherein Z is at least one moiety selected from $SO_2$ and CO, G is the moiety of at least one ethylenically unsaturated hydrocarbon of at least 2 carbon atoms polymerized through the ethylenic unsaturation, n is an integer of at least 1, and m is an integer of zero or greater, which process comprises contacting sulfur dioxide, ethylene, optionally carbon monoxide, and optionally at least one ethylenically unsaturated hydrocarbon of at least 3 carbon atoms, in the presence of a catalyst obtained from (1) a compound of a Group VIII metal selected from palladium, cobalt and nickel, (2) a bidentate ligand of the general formula

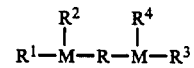

in which each m is a Group Va element selected from the group consisting of phosphorus, arsenic, and antimony, $R^1$, $R^2$, $R^3$, and $R^4$ independently are hydrocarbon or substituted hydrocarbon wherein the substituents are polar, R is a divalent organic bridging group of at least two carbon atoms, and (3) an anion of a non-hydrohalogenic acid having a pKa of less than 6, under conditions effective to prepare a linear alternating polymer.

DESCRIPTION OF THE INVENTION

The polymerization according to the invention is preferably carried out in the presence of a liquid diluting agent, such as an alkanol. Preferred alkanols are monohydric alcohols and in particular the lower alkanols of from 1 to 4 carbon atoms such as methanol, ethanol, propanol, iso-propanol, butanol and iso-butanol. Special preference is given to the use of methanol.

The method by which the catalyst composition and the monomer mixture to be polymerized are contacted during the polymerization is not critical. In one embodiment the catalyst composition can be introduced into the polymerization reactor as such, i.e. without a carrier material. If desired, the catalyst composition is first dissolved or suspended in a liquid medium, which is substantially removed afer the solution or suspension has been introduced into the reactor, for instance by spraying. Preference is given to the use of an alcohol as a liquid medium, in particular methanol.

The Group VIII metal compound in the catalyst compositions of the invention is a compound of palladium, cobalt or nickel. Palladium compounds are preferred, particularly palladium salts of carboxylic acids and in particular palladium acetate. Preferred acids to provide the anion of the catalyst complex are non-hydrohalogenic acids with a pKa of less than 6 (determined in aqueous solution at 18° C.), for example, sulfonic acids, such as methanesulfonic acid, trifluoromethanesulfonic acid and paratoluenesulfonic acid and carboxylic acids, such as trichloroacetic acid, difluoroacetic acid and trifluoroacetic acid. Preference is given to paratoluenesulfonic acid and trifluoroacetic acid. A particularly preferred class of acids have a pKa less than 4; acids with a pKa less than 2 are even more preferred. In the catalyst compositions, the anion is preferably present in a quantity of 0.5 to 200, and in particular of 1.0 to 10, equivalents of anion per gram atom of Group VIII metal.

If desired, the Group VIII metal and anion catalyst components are combined in a single compound. An example of such a compound is the complex $Pd(CH_3CN)_2(O_3S-C_6H_4-CH_3)_2$, which is prepared by reaction of palladium chloride with the silver salt of para-toluenesulfonic acid in acetontrile as the solvent.

In the bidentate ligand M is preferably phosphorus. The groups $R^1$, $R^2$, $R^3$ and $R^4$ present in the bidentate ligand preferably contain 6 to 14 carbon atoms. Special preference is given to bidentate ligands in which the groups $R^1$, $R^2$, $R^3$ and $R^4$ are phenyl groups or substituted phenyl groups. Substituted $R^1$, $R^2$, $R^3$ and $R^4$ are substituted with alkyl of 1 to 4 carbon atoms or with polar groups such as alkoxy of 1 to 4 carbon atoms, particularly methoxy. The bivalent organic bridging group R preferably contains three carbon atoms in the bridge. Examples of suitable bidentate ligands are 1,3-bis(di-p-tolylphosphino)propane, 1,3-bis(di-p-methoxyphosphino)propane, 1,3-bis(diphenylphosphino)propane, and 2-methyl-2-(methyldiphenylphosphino)-1,3-bis(diphenylphosphino)propane.

Preference is given to the use of either one of the latter two bidentate ligands, and particularly to 1,3-bis(diphenylphosphino)propane. The bidentate ligand is preferably used in a quantity of from 0.1 to 5 and in particular from 0.9 to 1.1 mol per mol of Group VIII metal compound.

Suitable ethylenically unsaturated hydrocarbons that can be polymerized with sulfur dioxide and optionally carbon monoxide according to the invention are compounds which consist exclusively of carbon and hydrogen. The polymerization according to the invention is preferably used for preparing polymers of sulfur dioxide and ethylene or polymers of sulfur dioxide, ethylene and one or more ethylenically unsaturated hydrocarbons other than ethylene. Examples of suitable hydrocarbon monomers other than ethylene are α-olefins of 3 to 10 carbon atoms inclusive, such as propylene, butene-1, hexene-1 and octene-1 as well as styrene and alkyl-substituted styrenes such as p-methylstyrene and p-ethylstyrene. Use of ethylene, or mixtures of ethylene and propylene as the ethylenically unsaturated hydrocarbon is particularly useful in the polymerization according to the invention, leading to, for example, the preparation of polymers of sulfur dioxide with ethylene and the preparation of terpolymers of sulfur dioxide with ethylene and propylene.

If a monomer mixture is used which contains, in addition to sulfur dioxide and ethylene, both propylene and butene, polymers will be obtained which contain units with the formula —$SO_2$—($C_3H_6$)— as well as units with the formula —$SO_2$—($C_4H_8$)—. If in addition the monomer mixture contains carbon monoxide, then units with the formula —CO—($C_3H_6$)— and units with the formula —CO—($C_4H_8$)— may also be present in the polymers. Even if the mixture to be polymerized contains only one olefinically unsaturated hydrocarbon besides ethylene, different units with the same general formula —$SO_2$—($C_xH_y$)— may be present in the prepared polymer. In this case, the numbers of carbon and hydrogen atoms in the various units will be the same, but the structures will be different. For example, when using propylene, units with the formula —$SO_2$—CH(CH$_3$)—CH$_2$— and units with the formula —$SO_2$—CH$_2$—CH(CH$_3$)— may be present in the prepared polymer. If in addition the monomer mixture contains carbon monoxide, units with the formula —CO—CH(CH$_3$)—CH$_2$— and units with the formula —CO—CH$_2$—CH(CH$_3$)— may also be present. When using olefins containing more carbon atoms than propylene, such as butene, pentene or octene, there may, in addition to the structural differences as described for propylene, also be structural differences as a result of isomerization. For example, when using 1-pentene, units with the following formulae can occur in the prepared polymer:
—$SO_2$—CH($C_3H_7$)—CH$_2$—
—$SO_2$—CH$_2$—CH($C_3H_7$)—
—$SO_2$—CH(CH$_3$)—CH($C_2H_5$)—
—$SO_2$—CH($C_2H_5$)—CH(CH$_3$)—.

Preferred polymers are those linear alternating polymers having the general formula

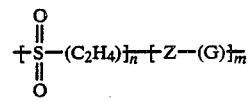

wherein Z is at least one moiety selected from $SO_2$ and CO, G is the moiety of at least one ethylenically unsaturated hydrocarbon of at least 2 carbon atoms polymerized throught the ethylenic unsaturation, n is an integer of at least 1, preferably 100 or more, and m is an integer of zero or greater. Preference is given to polymers in which G is the moiety of a single ethylenically unsaturated hydrocarbon such as ethylene or propylene. More preferred polymers are those in which G is ethylene and Z is CO and polymers in which Z is $SO_2$ and G is ethylene or propylene.

The quantity of catalyst composition used in the preparation of the polymers may vary within wide ranges. Per mol of olefinically unsaturated compound to be polymerized, such a quantity of catalyst is preferably used to contain from $10^{-7}$ to $10^{-3}$ and, in particular, from $10^{-6}$ to $10^{-4}$ gram atom of Group VIII metal.

The preparation of the polymers is preferably carried out at a temperature of from about 20° to about 200° C., preferably from about 3° to about 150° C., suitable pressures from about 1 to about 200 bar, and in particular a pressure from about 20 to about 100 bar. Temperatures and pressures are selected so as to maintain the reaction mixture in a gaseous phase. In the mixture to be polymerized, the preferred molar ratio of the ethylenically unsaturated organic compounds relative to carbon monoxide is from about 10:1 to about 1:5 and in particular from about 5:1 to about 1:2. The mechanical character of the polymerization reactor is not critical and reactors that have been found suitable for carrying out the polymerization are mechanically stirred reactors or "fluidized bed" reactors.

The polymers according to the invention have good mechanical properties. They can be processed by means of the usual techniques into, among other things, films, sheets, plates, fibers and molded objects. The low molecular weight polymers in particular are used as intermediates for the production of plastics, as components in blends with other polymers (such as waxes and greases) and as plasticizers for other polymers. The higher molecular weight polymers have use and utility as premium thermoplastics for fibers, films, injection molding, compression molding or blowing applications. On account of their properties, the higher molecular weight polymers according to the invention are suitable for many applications, such as in the auto industry, for the manufacture of packaging material for the foods and drinks, as constructional and building material, for the manufacture of cables and for a variety of applications in the domestic sphere. In order to modify their characteristics or to strengthen them, the polymers according to the invention can be employed in combination with many other sorts of materials.

The invention will now be illustrated with the aid of the following examples.

ILLUSTRATIVE EMBODIMENT I

A polymerization catalyst was prepared as follows. To a solution of 3 mmol palladium acetate in 50 ml methanol were successively added with stirring 9 mmol of para-toluenesulfonic acid and 4.5 mmol of 1,3-bis(diphenylphosphine)propane. The precipitated catalyst was filtered off, washed with methanol, and dried in vacuo at room temperature.

A sulfur dioxide/ethylene copolymer was prepared as follows, using the catalyst obtained in the above-described manner. 50 ml Methanol and 0.1 mmol BDL catalyst were introduced into a mechanically stirred autoclave of 250 ml capacity. The air present in the autoclave was replaced with sulfur dioxide by raising the pressure in the autoclave to 2 bar with sulfur dioxide and then releasing the pressure. Subsequently, sulfur dioxide was introduced into the autoclave until a pressure of 3.5 bar was reached, followed by ethylene, until a pressure of 30 bar was reached. Finally, the contents of the autoclave were heated to 120° C. After 5 hours the polymerization was stopped by lowering the temperature to room temperature and subsequently releasing the pressure. The polymer was filtered off, washed with methanol and dried in vacuo at room temperature. 1 g Copolymer with a melting point above 300° C. was obtained. It was established by means of solid state $^{13}$C-NMR analysis that the copolymer had a linear alternating structure made up of units with the formula

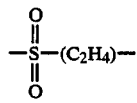

ILLUSTRATIVE EMBODIMENT II

A sulfur dioxide/ethylene/propylene terpolymer was prepared as follows: 50 mls Methanol, 0.1 mmol palladium acetate, 0.15 mmol 1,3-bis(diphenylphosphine)propane, and 2 mmol trifluoroacetic acid were introduced to a mechanically stirred autoclave of 300 ml capacity. The air present in the autoclave was removed by evacuation. Sulfur dioxide was introduced into the autoclave until a pressure of 2.5 bar was reached, followed by 15 mls of propylene, and finally followed by ethylene until a pressure of 30 bar was reached. The contents of the autoclave were heated to 100° C. After 5 hours the polymerization was stopped by lowering the temperature and subsequently releasing the pressure. The polymer was filtered off, washed with methanol and dried in vacuo at room temperature. 0.2 g Terpolymer with a melting point above 300° C. was obtained. It was established by means of solid state $^{13}$C-NMR analysis that the terpolymer had a linear alternating structure comprised of a random distribution of units of the formula

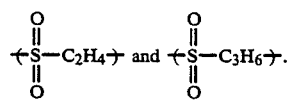

ILLUSTRATIVE EMBODIMENT III

When sulfur dioxide, ethylene and carbon monoxide are contacted in the presence of a catalyst as in Illustrative Embodiment I and under conditions similar to the conditions in Illustrative Embodiment I, a terpolymer of sulfur dioxide, ethylene and carbon monoxide willbe prepared.

What is claimed is:

1. A process for preparing a linear alternating polymer having the general formula

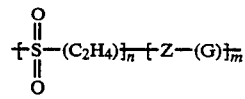

wherein Z is at least one moiety selected from $SO_2$ or CO, G is the moiety of at least one ethylenically unsaturated hydrocarbon of at least 2 carbon atoms polymerized through the ethylenic unsaturation, n is an integer of at least 1, and m is an integer of zero or greater, which process comprises contacting sulfur dioxide, ethylene, with or without carbon monoxide, and with or without at least one ethylenically unsaturated hydrocarbon of at least 3 carbon atoms, in the presence of a catalyst obtained from (1) a compound of a Group VIII metal selected from palladium, cobalt and nickel, (2) a bidentate ligand of the general formula

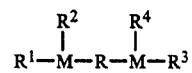

wherein each M is a Group Va element selected from the group consisting of phosphorus, arsenic, and antimony, $R^1$, $R^2$, $R^3$, and $R^4$ independently are hydrocarbon or substituted hydrocarbon wherein the substituents are polar, R is a divalent organic bridging group of at least two carbon atoms, and (3) an anion of a non-hydrohalogenic acid having a pKa of less than 6, under conditions effective to prepare a linear alternating polymer.

2. The process of claim 1 wherein the ethylenically unsaturated hydrocarbon compound is at least one of ethylene or propylene.

3. The process of claim 2 wherein the acid is selected from the group consisting of sulfonic acids having a pKa of less than 2 and carboxylic acids having a pKa of less than 2.

4. The process of claim 3 wherein the acid is selected from the group consisting of para-toluenesulfonic acid and trifluoroacetic acid.

5. The process of claim 3 wherein M is phosphorus.

6. The process of claim 5 wherein the Group VIII metal is palladium.

7. The process of claim 6 wherein the palladium compound is a palladium salt of a carboxylic acid.

8. The process of claim 5 wherein R is a bridging group of three carbon atoms and $R^1$, $R^2$, $R^3$, and $R^4$ are selected from the group consisting of phenyl and substituted phenyl.

9. The process of claim 1 wherein the bidentate ligand is selected from the group consisting of 1,3-bis(diphenylphosphine)propane and 2-methyl-2-(methyldiphenylphosphine)-1,3-bis(diphenylphosphine)propane.

10. The process of claim 6 wherein Z is CO and G is ethylene.

11. The process of claim 6 wherein Z is SO$_2$ and G is propylene.

12. The process of claim 1 wherein m is 0.

13. The process of claim 9 wherein contacting temperature is from about 20° to about 200° C. and contacting pressure is from about 1 to about 200 bar.

14. A process for preparing a linear alternating polymer having units of sulfur dioxide, ethylene, and carbon monoxide, which process comprises contacting sulfur dioxide, ethylene, and carbon monoxide in the presence of a catalyst obtained from (1) a palladium compound, (2) a bidentate ligand of the general formula

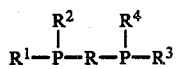

wherein R$^1$, R$^2$, R$^3$, and R$^4$ independently are hydrocarbon or substituted hydrocarbon wherein the substituents are polar, R is a divalent organic bridging group of at least two carbon atoms, and (3) an anion of a nonhydrohalogenic acid having a pKa of less than 2, under conditions effective to prepare a linear alternating polymer.

15. The process of claim 14 wherein the acid is para-toluenesulfonic acid.

16. The process of claim 15 wherein the bidentate ligand is selected from the group consisting of 1,3-bis(diphenylphosphine)propane and 2-methyl-2-(methyldiphenylphosphine)-1,3-bis(diphenylphosphine)propane.

17. A process for preparing a linear alternating polymer having units of sulfur dioxide, ethylene, and propylene, which process comprises contacting sulfur dioxide, ethylene, and propylene in the presence of a catalyst obtained from (1) a palladium compound, (2) a bidentate ligand selected from 1,3-bis(diphenylphosphine)propane and 2-methyl-2-(methyldiphenylphosphine)-1,3-bis(diphenylphosphine)propane, and (3) an anion of an oxygen containing acid having a pKa of less than 2, under conditions effective to prepare a linear alternating polymer.

18. The process of claim 17 wherein the acid is trifluoroacetic acid and the bidentate ligand is 1,3-bis(diphenylphosphine)propane.

* * * * *